United States Patent [19]

Shirley

[11] Patent Number: 4,974,897
[45] Date of Patent: Dec. 4, 1990

[54] POSITIONING SYSTEM WITH STAR MEMBER ROTATABLE WITHIN AND SLIDABLE ALONG A CHANNEL

[76] Inventor: Gerald Shirley, 133 Sagamore Rd., Tuckahoe, N.Y. 10707

[21] Appl. No.: 428,931

[22] Filed: Oct. 30, 1989

[51] Int. Cl.5 ................................................ B60J 3/02
[52] U.S. Cl. ................................... 296/97.8; 296/97.1; 296/97.11; 248/286
[58] Field of Search ................... 296/97.1, 97.4, 97.5, 296/97.6, 97.8, 97.11; 248/279, 286

[56] References Cited

U.S. PATENT DOCUMENTS

| | | | |
|---|---|---|---|
| 2,894,576 | 7/1959 | Williams | 296/97.6 X |
| 3,336,073 | 8/1967 | Berger | 296/97.6 |
| 3,428,360 | 2/1969 | Honor | 296/976 |
| 3,522,968 | 8/1970 | Honor | 296/97.6 |
| 4,747,569 | 5/1988 | Hoshino | 248/286 |

FOREIGN PATENT DOCUMENTS 494342 7/1950 Belgium ............................ 296/97.1

Primary Examiner—Margaret A. Focarino
Assistant Examiner—Gary C. Hoge
Attorney, Agent, or Firm—Bryan, Levitin, Franzino & Rosenberg

[57] ABSTRACT

A positioning system which is used for positioning a sun visor extension or other element, comprises a star member having a hub with a plurality of radially extending circumferentially spaced resilient vanes connected thereto. A channel member having a pair of elongated parallel walls frictionally receives the star member and is in frictional contact with at least some of the vanes. This permits the star member to be slid along the channel member. The star member can also rotate with respect to the channel member through the slight bending of the vanes which are in contact with the walls. A bore extends through the hub for receiving the elongated arm of a paddle shaped visor extension. With the channel connected to the sun visor of a vehicle, the paddle extension can be translated and rotated into any desired position.

14 Claims, 1 Drawing Sheet

POSITIONING SYSTEM WITH STAR MEMBER ROTATABLE WITHIN AND SLIDABLE ALONG A CHANNEL

FIELD AND BACKGROUND OF THE INVENTION

The present invention relates in general to positioning and coupling apparatus, and in particular to a new and useful positioner which is capable of positively positioning one element with respect to another at a multiplicity of orientations. The invention is used in particular for positioning a sun visor extension but may be used in a wide variety of other applications.

Existing sun visors employed in land, sea and air vehicles are unable to prevent blinding glare when the sun is ahead and low on the horizon, which occurs during hours when the sun is rising and setting. Forward sun glare causes partial and sometimes complete loss of forward vision which causes fear and discomfort, and can place a vehicle and its occupants in danger of collisions with other vehicles or immovable roadside objects, with resulting injuries and fatalities as well as property damage.

Existing sun visors fail to overcome sun glare because they cannot be made big enough to do so without at the same time blocking a driver's vision of everything else ahead. Attempts to overcome the problem in the form of visor-wide dark filter flip-down attachments have proven unsatisfactory and have failed to achieve even a fingerhold in the marketplace.

However, an opaque auxiliary shield or paddle attachment will work, and would be useful if it could be manipulated and positioned easily and quickly with a minimum of attention. This is particularly important in the environment of a moving vehicle. An optimally effective embodiment of this concept calls for coefficients of friction between the various cooperating system members to be as low as possible, but at the same time consistent with the strict requirement that once the paddle or other suspended object is moved to a desired spatical position it will remain there despite any external forces. One such source is constant—i.e. gravity. Others are intermittent, such as vehicle vibrations, and in particular vertical shaking and jolting caused by unevenness, bumps, depressions and holes in the roadway.

When the movement of a system member is confined to the horizontal plane, a relatively low level of friction can provide positional stability. But where a member's movement is vertical or has a vertical component (vector) or where it can rotate in a vertical plane and is asymmetrically loaded, it is subject to gravity and inertial momentum and therefore requires a higher level of friction to maintain the required positional stability.

If, as in the case of the present invention, a cooperating member functions in both the horizontal and vertical planes, it would be advantageous to find means whereby the friction obtained during the horizontal movement will be less than that obtained during the vertical or rotational movement. Such means have been devised and comprise a key part of the present invention, as will be described in the following.

SUMMARY OF THE INVENTION

One object of the present invention is to provide a positioning system which can be used to mount an auxiliary sun visor extension onto an existing sun visor in a vehicle, and to position the extension in any desired orientation with respect to the visor.

A further object of the present invention is to provide a positioning system which can be used to position any two elements with respect to each other at a variety of orientations.

Still another object of the present invention is to provide a circular bearing or coupler member which, when mounted captively in a channel, requires higher force to be rotated than to be translated.

According to the present invention, a star member comprising a hub and a plurality of circumferentially spaced radially extending vanes is frictionally held between the parallel walls of a channel member. An element which is to be held at a variety of orientations with respect to the star member and to the channel member is engaged with the hub. If the hub carries an even number of vanes, two adjacent vanes lightly contact each wall on either side of the hub for centering the hub in the channel and for permitting low friction sliding of the hub along the channel. Where an odd number of vanes are provided on the hub, two vanes engage one wall on one side of the hub and a single vane engages the wall on the opposite side of the hub. The vane length is chosen so that the OD of the star member is slightly greater than the distance between the walls of the channel member.

Either the vanes, the channel member or both are made of somewhat resilient material such as plastic so that the star member may be rotated in the channel. Rotation causes slight bending in the vanes or spreading of the walls so that a new combination of vanes contact the walls. The rotational movement of the vanes is resisted to a greater extent than the lateral movement of the star member along the channel. According to one embodiment of the invention, a sun visor extension is provided in the form of a paddle having an elongated arm connected thereto. The elongated arm is frictionally engaged into a hole extending through the hub of the star member. In this way, the paddle can be moved transversely to the hub along its arm. In addition, the paddle can be rotated or laterally moved by rotating or sliding the star member with respect to the channel.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which the preferred embodiments of the invention are illustrated.

DESCRIPTION OF THE PREFERRED EMBODIMENTS

Figure 1:
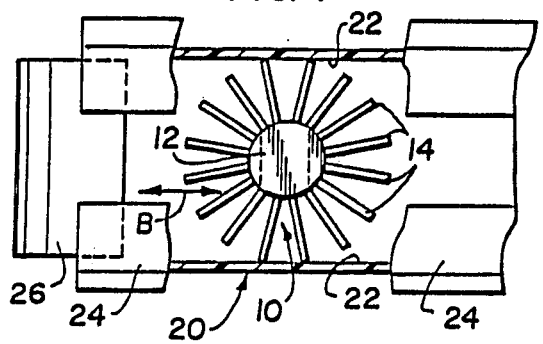
FIG. 1 is a fragmentary elevational view, partially in section, showing the positioning system of the present invention.
Figure 2:
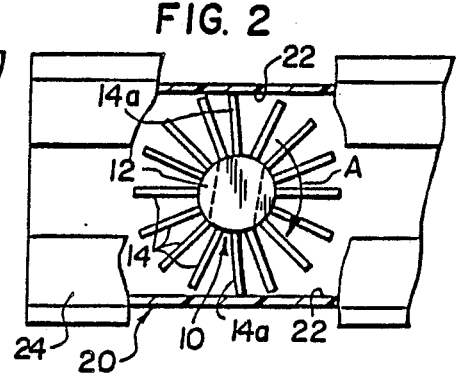
FIG. 2 is a view similar to FIG. 1 showing how a star member of the positioning system can be rotated into a new rotational positioning.

Referring to the drawings in particular, the invention embodied in FIGS. 1 and 2 comprises a positioning system having a star member generally designated 10 which is advantageously constructed of hard yet resilient plastic. Star member 10 is frictionally held between the parallel elongated walls 22, 22 of a channel member generally designated 20.

Figure 3:
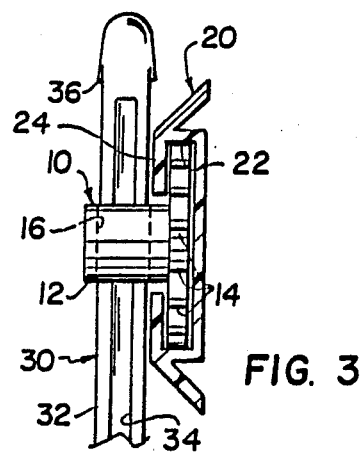
FIG. 3 is a transverse sectional view showing the positioning system of FIG. 1 in combination with the arm of a sun visor extension.

Star member 10 comprises a hub 12 having a base extending into the channel member 20. A plurality of circumferentially spaced radially extending resilient vanes 14 are connected to the base of the hub. In the illustrated embodiments, an even number (16) of vanes 14 are provided so that two vanes frictionally engage each wall 22, on opposite sides of the hub 12. This is a low friction engagement so that the star member 10 can easily be slid along the channel 20 in the direction of double arrow B. As best shown in FIGS. 1 and 3, star member 10 is trapped within the channel of channel member 20 by covers 24 which extend over the walls 22 of the channel member.

In addition to laterally moving the star member in the channel member, the star member may be rotated to a multiplicity of rotational positions. Rotation is achieved by turning the hub 12 on its axis in the direction of arrow A in FIG. 2. This causes two of the vanes 14a, 14a which were in contact with the walls 22, 22 to flex slightly until these vanes pass the wall. A stable or "rest" position is reached when the flexed vanes 14a pass their dead center position with respect to the walls 22. This returns the star member to a condition where two vanes are in low friction contact with each of the walls on opposite sides of the hub. It will be understood that the star member can be rotated either clockwise or counterclockwise.

The channel member 20 may also be made of resilient plastic so that, in addition to bending of the vanes 14a, or instead of such bending, the walls 22 may spread slightly to permit rotation of the star member.

As shown in FIG. 3, hub 12 includes a transverse bore 16 therethrough which frictionally receives the elongated arm 32 of a sun visor extension generally designated 30. Tabs 36 are provided at the end of the arm 32 to retain the arm in the hub 12. Arm 32 is advantageously made of plastic material and includes a longitudinally extending groove 34 which permits the arm to compress slightly to improve the frictional engagement between the arm and the hub 12.

Arm 32 has a circular cross section so that it can be rotated with respect to the hub. Alternatively, the arm may have an oval or polygonal cross section which precludes relative rotation between the arm and the hub, but which continues to permit the arm to slide parallel to its axis and with respect to the hub.

Figure 5:
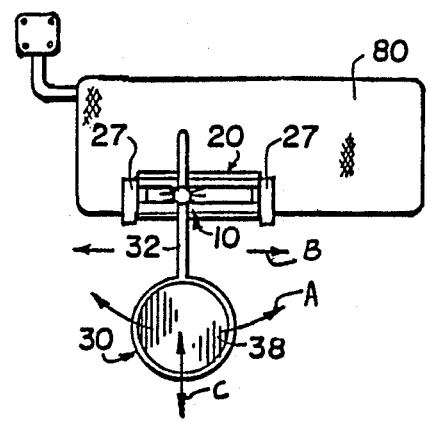
FIG. 5 shows an arrangement for using the present invention on a vehicle sun visor.

FIG. 5 shows how the channel member 20 can be connected by a pair of metal clips 27 which are clipped somewhat like clothes pins to the bottom edge of a sun visor 80 of a vehicle. The sun visor extension 30 which includes a paddle 38 connected to an arm 32, can be rotated in the direction of arrow A, and slid laterally with respect to the visor in the direction of arrow B. In addition, the paddle 38 can be moved along its arm 32 in the direction of arrow C. This provides a multiplicity of relative positions between the paddle 38 and the visor 80 so that the paddle can be brought into any desired position for blocking sun which has not been blocked by the visor.

Figure 4:
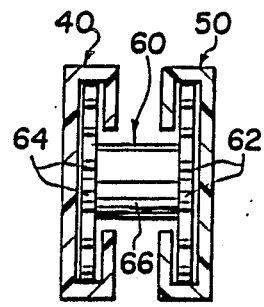
FIG. 4 is a transverse sectional view showing another embodiment of the invention.

FIG. 4 shows an alternate embodiment of the invention wherein the star member 60 is used to position a pair of channel members 40, 50 with respect to each other. The star member includes a hub 66 which has opposite ends which each carry a plurality of radially extending circumferentially spaced vanes 62 and 64. As with the embodiment of FIG. 1, the star member 60 can be moved under low friction along the length of either channel member 40 or 50 with rotation between these members being possible through the use of somewhat higher force.

While the specific embodiments of the invention have been shown and described in detail to illustrate the application of the principles of the invention, it will be understood that the invention may be embodied otherwise without departing from such principles.

What is claimed is:

1. A positioning system for positioning a first element at a selected orientation with respect to a second element comprising:
    a star member having a hub and a plurality of radially extending circumferentially spaced vanes connected to said hub;
    said second element including means defining a pair of parallel spaced apart walls, said star member being fractionally engaged between said walls with two of said vanes in frictional sliding engagement with one of said walls, and at least one of said vanes in frictional sliding engagement with the other of said walls whereby said hub is rotatable between said walls and translatable along said walls; and
    said hub including engagement means for engaging said first element at a selected orientation with respect to said second element.

2. A positioning system according to claim 1 wherein said vanes are resilient.

3. A positioning system according to claim 1 wherein said means defining the pair of walls comprises an elongated channel member, each of said walls being elongated, said channel member including a cover extending over each wall and covering at least some of said vanes.

4. A positioning system according to claim 3 wherein said hub of said star member extends beyond said cover.

5. A positioning system according to claim 4 wherein said engagement means comprises a bore extending through said hub, said element comprising an arm frictionally engaged in said bore for sliding movement in said bore.

6. A positioning system according to claim 5 wherein said first element comprises a sun visor extension having a paddle connected to said arm.

7. A positioning system according to claim 4 wherein said engagement means comprises a second plurality of radially extending circumferentially spaced vanes connected to said hub at a location spaced from said first mentioned plurality of vanes, said first element comprising a second channel member having a pair of spaced apart walls for receiving said hub therebetween and into which at least three of said additional vanes are frictionally engaged.

8. A positioning system according to claim 5 including a clip connected to at least one end of said channel member for holding said channel member to a support.

9. A sun visor extension comprising:

a star member having a hub and a plurality of radially extending circumferentially spaced vanes connected to said hub;

means defining a pair of parallel spaced apart walls attached to said sun visor, said star member being frictionally engaged between said walls with at least three of said vanes in frictional sliding engagement with said walls whereby said hub is rotatable between said walls and translatable along said walls; and a sun visor extension member slidably mounted to said hub for orientation at a multiplicity of positions with respect to said walls.

10. A sun visor extension according to claim 9 wherein said sun visor extension member comprises an arm frictionally engaged for sliding movement within said hub and a paddle connected to said arm.

11. A sun visor extension according to claim 10 wherein said hub includes a bore therethrough, said arm frictionally engaged for sliding movement in said bore.

12. A sun visor extension according to claim 11 wherein said vanes are resilient.

13. A sun visor extension according to claim 12 wherein said means defining a pair of elongated parallel walls comprises a channel member carrying said walls and having a cover over each of said walls, said hub having a portion extending beyond said covers to which said arm is engaged.

14. A sun visor extension according to claim 13 wherein at least one of said channel member, said sun visor extension member and said star member are made of resilient plastic.

* * * * *